Patented Apr. 19, 1938

2,114,437

UNITED STATES PATENT OFFICE 2,114,437

DISTILLATE PETROLEUM PRODUCT AND METHOD OF TREATING THE SAME

Henry G. Berger and Edwin M. Nygaard, Woodbury, N. J., assignors to Socony-Vacuum Oil Company, Incorporated, New York, N. Y., a corporation of New York No Drawing. Application April 15, 1936, Serial No. 74,510

4 Claims. (Cl. 44—9)

This invention relates to distillate petroleum products, more particularly to light distillates such as gasoline and kerosene, and to the stabilization thereof with respect to color and gum formation, and the removal of color developed therein during storage.

The purpose of the invention is to produce stabilized and decolorized distillates by the addition of an agent of suitable composition, and particularly of an agent which will function successfully notwithstanding the presence of water in the distillate.

In U. S. Letters Patent Nos. 1,959,316 and 1,959,317, to James B. Rather et al. it is disclosed that alkyl substituted hydroxy-benzenes have decolorizing and stabilizing properties similar to those of the corresponding hydroxy-benzenes, but are preferable to the latter by reason of the fact that they are less soluble in water, and are therefore more effective where water is present in the distillates to which they are added.

We have discovered that similar desirable characteristics are possessed by certain cyclohexyl-substituted hydroxybenzenes, which also are less soluble in water than the simple hydroxybenzenes, and therefore constitute superior decolorizing and stabilizing agents where water is present.

The hydroxybenzene constituting the basis of the stabilizing agent, to which this invention relates, may be phenol, hydroquinone or pyrogallol. The substitution products may be made by reacting the hydroxybenzenes with cyclohexyl alcohol in the presence of dehydrating agents such as freshly fused zinc chloride, phosphorous pentoxide, concentrated sulphuric acid or 70% sulphuric acid and glacial acetic acid, in a manner already known.

Any of these substitution compounds, when thoroughly mixed with the distillate to be treated, is effective in a very small quantity, of the order of .002% or less. The compound may be dissolved in the distillate conveniently by percolating the latter through a crystalline mass of the compound, or by dissolving the compound in a small quantity of a solvent, such as isopropyl alcohol, which is miscible with the distillate, and adding this concentrated solution to the distillate.

The compounds in question act to inhibit the development of color and gum, and they also act to destroy or remove color previously developed. As an example of the decolorizing effects of the compounds in question, tests were made on a discolored American kerosene having a Saybolt color of 6, the compounds and quantities used, and the colors after 48 hours, being as shown in the following table:

| Compound | Amount | Color |
|---|---|---|
|  | Parts |  |
| Cyclohexyl hydroquinone | 1/25,000 | 19 |
| Cyclohexyl hydroquinone | 1/50,000 | 20 |
| Cyclohexyl pyrogallol | 1/25,000 | 18 |
| Cyclohexyl pyrogallol | 1/50,000 | 18 |

This test showed no advantage in using a quantity greater than one part in 50,000.

In another test similar to that above described, on an American kerosene showing a Saybolt color of −16, cyclohexylphenol improved the color to +9.

Isomeric forms of the same substituted hydroxybenzenes have, apparently, substantially equal efficacy. In the last mentioned test, for example, the ortho and the para forms of cyclohexyl phenol gave the same results.

We claim as our invention:

1. The combination, with a low-boiling normally light colored distillate petroleum product, of the class of gasoline or kerosene, which tends to develop color and gum during storage, of material from the class consisting of the cyclohexyl substitution products of hydroquinone and pyrogallol, in a quantity sufficient to reduce appreciably the tendency to such deterioration or the color already so developed.

2. The method of reducing the color developed, as the result of oxidation during storage, in normally light colored distillate petroleum of the class of gasoline and kerosene, which consists in treating the same with material from the class consisting of the cyclohexyl substitution products of hydroquinone and pyrogallol, in a quantity sufficient to produce appreciable diminution of such color.

3. The combination, with a low boiling normally light colored distillate petroleum product, of the class of gasoline or kerosene, of cyclohexyl hydroquinone in a quantity sufficient to diminish appreciably the visible effects of oxidation during storage.

4. The combination, with a low boiling normally light colored distillate petroleum product, of the class of gasoline or kerosene, of cyclohexyl pyrogallol in a quantity sufficient to diminish appreciably the visible effects of oxidation during storage.

HENRY G. BERGER.
EDWIN M. NYGAARD.